United States Patent [19]

Fang

[11] Patent Number: 5,003,745

[45] Date of Patent: Apr. 2, 1991

[54] DOOR OF CONCAVITY SURFACE

[76] Inventor: Ho-Tsung Fang, P.O. Box 32-19, Kaohsiung, Taiwan

[21] Appl. No.: 468,231

[22] Filed: Jan. 22, 1990

[51] Int. Cl.[5] ........................ B44F 11/00; B32B 21/04; E04C 2/24; E06B 3/00

[52] U.S. Cl. .................................. 52/316; 52/309.14; 52/309.9; 52/311; 52/313

[58] Field of Search .................. 52/311, 309.9, 309.14, 52/313, 316, 445

[56] References Cited

U.S. PATENT DOCUMENTS

| | | | |
|---|---|---|---|
| 1,180,516 | 4/1916 | McIndde | 52/313 X |
| 2,248,233 | 7/1941 | Heritage | 52/316 X |
| 2,889,651 | 6/1959 | Baldanza | 52/316 X |
| 3,404,502 | 10/1968 | Miller | 52/311 X |
| 3,452,861 | 7/1969 | Erwin | 52/316 X |
| 3,786,609 | 1/1974 | DiFazio | 52/309.9 X |
| 3,797,904 | 3/1974 | Krauth | 52/313 X |
| 3,950,894 | 4/1976 | DiMaio | 52/309.9 X |
| 4,189,888 | 2/1980 | Blitzer, Jr. | 52/311 X |
| 4,550,540 | 11/1985 | Thorn | 52/313 X |
| 4,579,613 | 4/1986 | Belanger | 52/311 X |
| 4,864,789 | 9/1989 | Thorn | 52/309.9 |
| 4,901,493 | 2/1990 | Thorn | 52/309.9 |

FOREIGN PATENT DOCUMENTS

| | | | |
|---|---|---|---|
| 2435591 | 5/1980 | France | 52/313 |

*Primary Examiner*—David A. Scherbel
*Assistant Examiner*—Deborah McGann Ripley
*Attorney, Agent, or Firm*—Bacon & Thomas

[57] ABSTRACT

A door includes a board having opposed depressed portions formed in major opposed side walls and two thermoplastic sheets respectively attached to the major side walls of the board and having depressed portions shaped or embossed with decorative designs, fitted in the depressed portions of the board.

1 Claim, 2 Drawing Sheets

PRIOR ART

DOOR OF CONCAVITY SURFACE

FIELD OF THE INVENTION

This invention relates to the structure of a door, and more particularly to a door with its board covered with thermoplastic sheets which are embossed with decorative patterns or figures within deformed depressions or cavities.

BACKGROUND ART

Doors covered with plastic sheets which are embossed with decorative patterns or figures by means of thermoplastic deformation art for closing the entrance to a building, room, cupboard, etc. are well known in the prior art. Referring to FIG. 2, a thermoplastic sheet 10 of a suitable thickness and about the size of a major side wall of a board of a door is used and then heated to the plastic deformable state by a heater or suitable number of infrared heaters located on the top and bottom of the sheet 10. The thermoplastic sheet 10 may be moved relative to the heaters or the heaters may be moved relative to the sheet 10 so as to evenly distribute the heating effect to the sheet 10 to achieve a uniform deformable plastic state.

The thermoplastic sheet 10 is then placed between a male die 11 and a female die 12 and further sealed therebetween. The metal block of the male die 11 is cut with desired pattern or FIG. 111 and provided with a plurality of passages 110 extending downwardly to connect an air conduit 13 which is connected to a vacuum pump (not shown). The vacuum pump will create a vacuum in the chamber in top portion of the male die 11 to form desired pattern or FIG. 102 in the sheet 10 corresponding to the shapes cut in the male die 11 by creating an excess of pressure on the upper face of the sheet 10. After this is accomplished, the thermoplastic sheet 11 is then removed form the molds 11 and 12 into the open air for air cooling.

Two such thermoplastic sheets 10 both of a size can be attached to major opposed sides of the board of the door by means of adhesives.

It is found that the embossed patterns or figures of the thermoplastic sheets attached to doors are easy to be fractured in transport as doors generally stacked up in container or aboard. To alleviate this problem sufficient stuffing arranged among doors is necessary to prevent the embossed patterns or figures from fracturing or undesired deformations caused by loading pressure, and that is obviously costly and labour consuming.

The present invention provides an improved door covered with thermoplastic sheets each of which has a concavity surface for been shaped or embossed with decorative design such as pattern or figure.

Accordingly, it is an object of the present invention to provide an improved door with its concavity surface for securing designs shaped or embossed therein from being fractured.

It is a further object of the present invention to provide an improved door with a concavity surface which is easy to pack and labour and space savings in packaging.

BRIEF DESCRIPTION OF THE DRAWINGS

While the specification concludes with my claim particularly pointing out and distinctly claiming the subject matter which is regarded as the present invention, it is believed that the invention will be better understood from the following description taken in connection with the accompanying drawings in which:

FIG., 3 is a side elevational view of two doors of the present invention in stacking condition.

DETAILED DESCRIPTION OF THE PRESENT INVENTION

Figure 1:
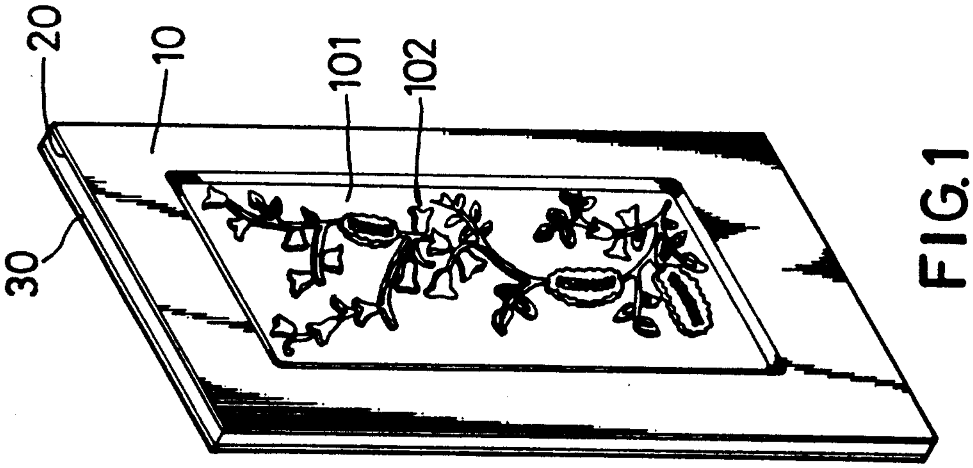
FIG. 1 is a perspective view showing a preferred embodiment of the present invention.
Figure 3:
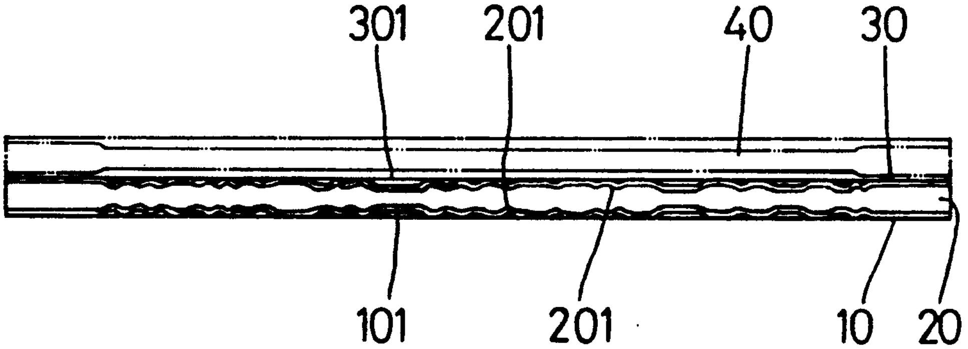

Referring to FIGS. 1 and 3, a door according to the present invention comprises a board 20 an opposedly depressed portion 201 preferably formed in mid portion of its major opposed side walls and two thermoplastic sheets 10, 30 exactly and respectively attached to the major side walls of the board 20. Each of said sheets 10, 30 has a depressed portion 101 or 301 preferably corresponding to respective depressed portion 201 of the board 20 in dimension and within which is shaped or embossed with a decorative design such as a flower design 102.

In attachement condition, the depressed portions 101, 301 fit in the depressed portion 201 of the board 20 wherein the shapes of bottoms of the depressed portions in the major opposed side walls of the board can be flat or entirely mating with corresponding portions of the sheets 10, 30, as shown in FIG. 3. The patterns 102 within each depressed portion 101 or 301 of the sheet 10 or 30 is shaped or embossed on or below a level with its surface so that there is no disturbance between stacked doors in package.

Figure 2:
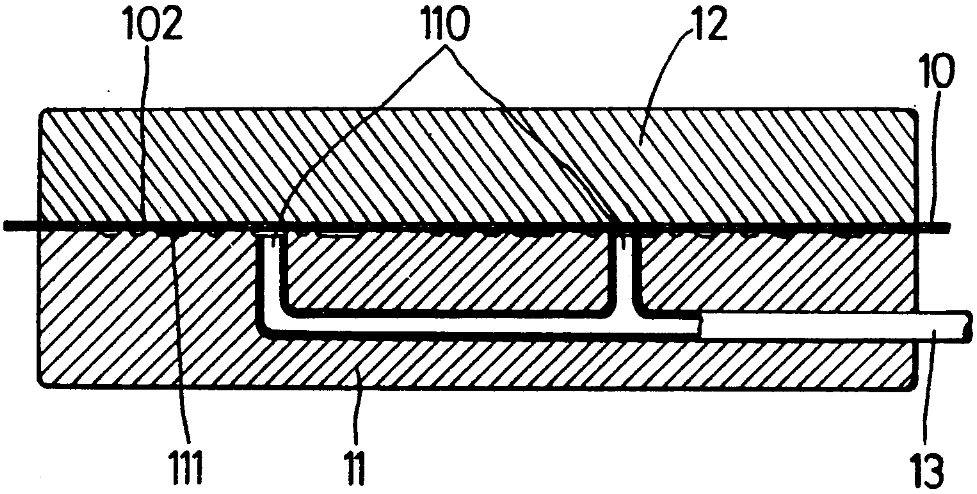
FIG. 2 is a cross-sectional view showing the molding process of a thermoplastic sheet.

The patterns or designs of the sheets of this invention are shaped or embossed through prior thermoplastic deformation art described above and shown in FIG. 2 except that a depression or cavity corresponding to said depressed portion should be previously machined in the metal block of the male die 11, then cut desired pattern or figure within the depression or cavity.

Figure 4:
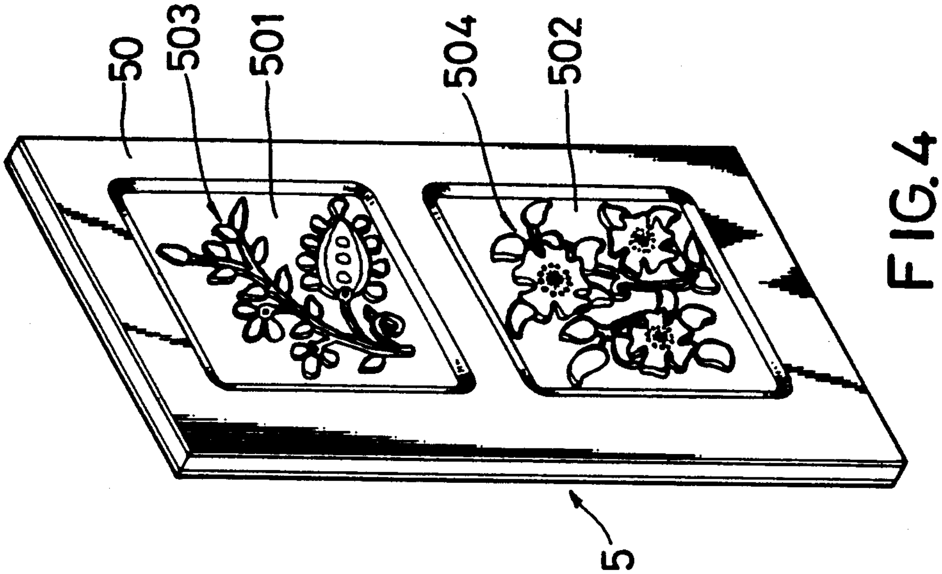
FIG. 4 is a perspective view showing another preferred embodiment of the present invention.

It should be noted that two or more depressions or cavities 501, 502 with individual patterns or FIGS. 503, 504, as shown in FIG. 4, can be formed in one major side of the door 5 according to user's choice.

It is to be understood that the forms of the invention described and illustrated herein are to be taken as preferred embodiments. Various changes and modifications can readily be made by one or ordinary skill in the art without departing from the spirit or scope of the present invention as defined in the appended claims.

What is claimed is:

1. A door of concavity surface comprising:

a door board having at least a major side wall formed with at least a depressed portion;

at least a thermoplastic sheet attached to the major side wall of the door board and having a surface formed with at least a depressed portion to be fitted in the depressed portion of the major side wall of the door board; and at least a pattern shaped in the depressed portion of the thermoplastic sheet below a level with the surface of the thermoplastic sheet.

* * * * *